United States Patent [19]

Sakamoto

[11] 4,258,389

[45] Mar. 24, 1981

[54] CIRCUIT FOR FORMING A VERTICAL SYNCHRONIZING SIGNAL

[75] Inventor: Hitoshi Sakamoto, Zama, Japan

[73] Assignee: Sony Corporation, Tokyo, Japan

[21] Appl. No.: 5,794

[22] Filed: Jan. 23, 1979

[30] Foreign Application Priority Data

Feb. 3, 1978 [JP] Japan .................................. 53-10528

[51] Int. Cl.³ .......................................... H04N 5/08
[52] U.S. Cl. .................................. 358/154; 328/111; 329/106
[58] Field of Search ........................ 358/148, 153, 154; 329/106; 328/111, 112, 113, 139; 307/234, 229

[56] References Cited

U.S. PATENT DOCUMENTS

| 3,588,718 | 6/1971 | Oiso | 329/106 |
|---|---|---|---|
| 3,801,828 | 4/1974 | Lynn et al. | 307/234 |
| 3,886,463 | 5/1975 | Caprio | 329/106 |
| 3,925,613 | 12/1975 | Kokado | 358/154 |
| 3,979,605 | 9/1976 | Fukaya | 358/154 |

*Primary Examiner*—Benedict V. Safourek
*Attorney, Agent, or Firm*—Lewis H. Eslinger; Alvin Sinderbrand

[57] ABSTRACT

A circuit for forming a vertical synchronizing pulse at the end of a field of a composite video signal utilizes the characteristic of the video signal that the equalizing pulses in the vertical blanking interval have a pulse width one-half that of the horizontal synchronizing pulses in the composite video signal. Accordingly, the circuit includes a discriminating pulse generator which generates a discriminating pulse whose duration ends before the trailing edge of a horizontal synchronizing pulse, but after the trailing edge of an equalizing pulse; a comparator, such as a D-type flip-flop, for comparing the timing of the discriminating pulses with that of the equalizing and horizontal synchronizing pulses to discriminate the equalizing pulses on the basis of such comparison; and a generator for generating the vertical synchronizing pulse in response to the discrimination of the equalizing pulses.

7 Claims, 12 Drawing Figures

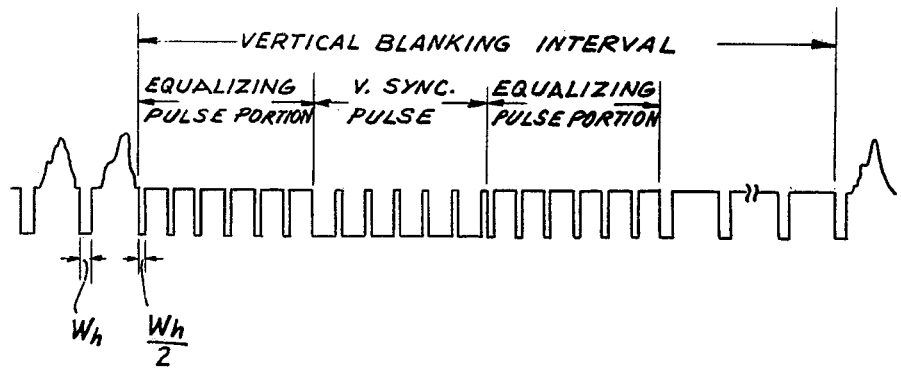
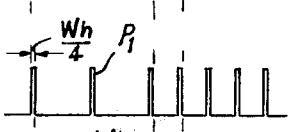
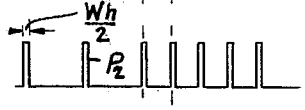
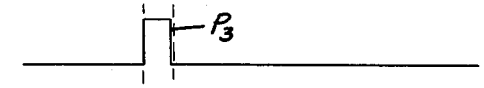
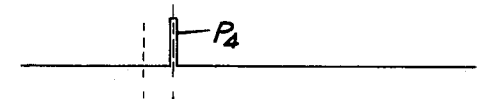
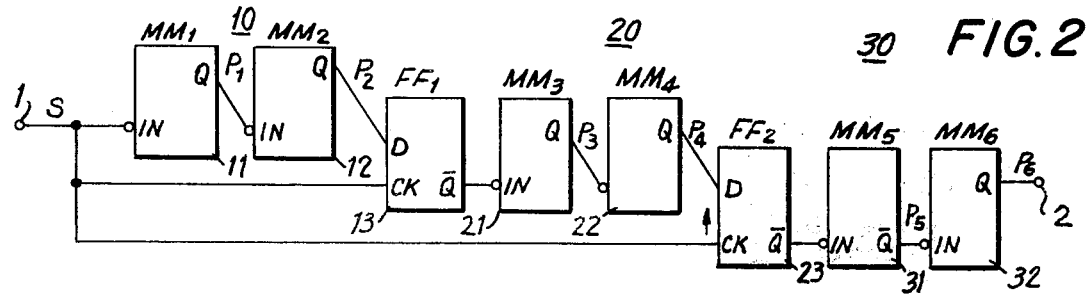

4,258,389

CIRCUIT FOR FORMING A VERTICAL SYNCHRONIZING SIGNAL

FIELD OF THE INVENTION

This invention relates to a circuit for forming a vertical synchronizing signal and in particular is directed to a circuit for separating vertical synchronizing signal precisely by utilizing a characteristic of the composite synchronizing signal of a television signal in the vertical blanking interval thereof.

DESCRIPTION OF THE PRIOR ART

The conventional video tape recorder and the conventional television receiver are provided with vertical synchronizing signal forming circuitry, which is mainly composed of an integrating circuit and a level comparator. A composite synchronizing signal separated from the video signal is firstly supplied to the integrating circuit which generates a relatively high D.C. voltage during the vertical synchronizing signal. The D.C. voltage from the integrating circuit is compared with a reference level in the level comparator. As a result the level comparator provides, a pulse signal at a position corresponding to that of the vertical synchronizing signal and the pulse signal is used in place of the vertical synchronizing signal.

However, in the above circuitry, the integrated output is greatly affected by external noise and temperature variation, so that the level and timing of the leading edge and the trailing edge of the separated pulse signal will fluctuate in accordance with level of the integrated output. As a result, such prior are circuitry is disadvantageous in that a stable vertical synchronizing signal cannot be obtained therefrom.

Furthermore, if the video signal is a signal reproduced from magnetic tape by a video tape recorder (VTR), in which a magnetic tape is wrapped about 360° on the periphery of a drum and a field the video signal is recorded on each track of the magnetic tape by one rotary head, the vertical synchronizing signal is not faithfully reproduced, because the switching portion of the video signal is usually located during the vertical synchronizing interval. Therefore, it is impossible in such a VTR to separate the vertical synchronizing signal by means of the above-described circuitry.

SUMMARY OF THE INVENTION

One object of this invention is to provide a vertical synchronizing signal separating circuit which overcomes the above described disadvantages of the conventional circuit.

Another object of this invention is to provide a circuit for separating a vertical synchronizing signal stably and exactly by use of digital circuitry.

Still another object of this invention is to provide a circuit for forming a corresponding vertical synchronizing signal, even if the vertical synchronizing signal is lacking from the received or reproduced video signal.

According to an aspect of this invention, a vertical synchronizing signal generating circuit includes a discriminating circuit for discriminating between equalizing pulses occurring in the vertical blanking interval and horizontal synchronizing pulses occurring in the composite synchronizing pulse signal on the basis that the equalizing pulses have a pulse width one-half that of the horizontal synchronizing signals. A vertical synchronizing pulse generating circuit then provides a vertical synchronizing pulse at the end of a field interval in response to the discrimination of the equalizing pulses.

The above, and other objects, features and advantages of this invention will be apparent from the following detailed description of an illustrative embodiment, which is to be read in connection with accompanying drawings.

BRIEF DESCRIPTION OF THE DRAWINGS

FIG. 1 shows waveform of a composite video signal;
FIG. 2 is a circuit diagram of a vertial synchronizing signal producing circuit according to this invention;
FIGS. 3a-3b show waveforms which are used for explaining the operation of the vertical synchronizing signal producing circuit of FIG. 2.

DESCRIPTION OF THE PREFERRED EMBODIMENTS

Firstly, the composite video signal will be explained with references to FIG. 1, in which the the vertical of verticaly blanking interval of the video signal is shown. Here, the vertical blanking interval is one that occurs at the end of an even field. The vertical blanking interval following the video signal interval continues for a 21 H period, that is, for the duration of twenty-one horizontal scanning intervals. The leading 3 H period of the vertical blanking interval is called an equalizing pulse portion thereof and the vertical synchronizing signal portion follows for a 3 H period after the equalizing pulse portion. Another equalizing pulse portion is formed for a 3 H period immediately after the vertical synchronizing signal portion. It should be herein noted that the equalizing pulse is inserted intermediate between the horizontal synchronizing pulses during the equalizing pulse portions and the vertical synchronizing signal portion, and further that the pulse width of the equalizing pulses, which replace the horizontal synchronizing pulses in the equalizing pulse portion, is half the pulse width of the normal horizontal synchronizing pulse (The pulse width Wh of the normal horizontal synchronizing pulse is 5.0μ sec in an NTSC signal). The vertical synchronizing signal separating circuit according to this invention forms the corresponding vertical synchronizing signal by utilizing the above described characteristic of the composite video signal.

FIG. 2 shows one embodiment of the vertical synchronizing signal separating circuit of this invention which comprises a pulse width detecting circuit 10 including monostable multivibrators 11, 12 and D-type flip-flop 13, a pulse interval detecting circuit 20 including monostable multivibrators 21, 22 and and a D-type flip-flop 23 and a wave forming circuit 30 including monostable multivibrators 31, 32.

The composite synchronizing signal S shown in FIG. 3(a), which is separated from the composite video signal shown in FIG. 1, is supplied through an input terminal 1 to the monostable multivibrator 11 which is triggered by the negative-going edge of the composite synchronizing signal S. Consequently, the monostable multivibrator 11 generates a pulse signal P1 having a pulse width ¼ Wh, as shown in FIG. 3(b). The pulse signal P1 is further supplied to the monostable multivibrator 12 which is triggered by the negative-going edge of the pulse signal P1. A pulse signal P2 having a pulse width ½ Wh is generated from the Q-output of the monostable multivibrator 12. This means that the pulse signal P2 is delayed by ¼ Wh from the leading edge of the synchronizing signal S. The pulse signal P2 is supplied to the D-terminal of the flip-flop 13, while the composite synchronizing signal S is supplied to clock-terminal thereof. As a result, the flip-flop 13 memorizes the state of the pulse signal P2 at timing of the positive-going edge of the signal S. In other words, during the video signal interval the horizontal pulse greater is wider than the total pulse width of the pulse signals P1 and P2, so that the pulse signal P2 is in its low level at the timing of the positive-going edge of the signal S. Therefore, the Q-output of the flip-flop 13 remains at a keeps high level during the video signal interval. On the other hand, the pulse width of the equalizing pulse is narrower than the total pulse width of the pulse signals P1 and P2, so that the pulse signal P2 is in its high level at the timing of the positive-going edge of the signal S. As a result, the Q-output of the flip-flop 13 goes to a low level upon occurrence of the pulse P2, as shown in FIG. 3(d). Thus, the Q-output of the flip-flop 13 indicates that the pulse width of the composite synchronizing signal S has changed from the wider one to the narrower one. Accordingly, it is possible to detect the vertical synchronizing signal portion from the Q-output of the flip-flop 13. However, there is a possibility of misoperation or misdetection due to drop-out of the signal or noise, if the corresponding vertical synchronizing signal is formed only by detecing the pulse width of the synchronizing signal. Therefore, in the circuit according to this invention, the interval of the equalizing pulses is detected in response to the output of the flip-flop 13 to assure accurate positioning of the vertical synchronizing signal.

A pulse interval detecting circuit 20 is provided to detect the interval of the equalizing pulses, in which the Q-output of the flip-flop 13 is supplied to a monostable multivibrator 21 to trigger the latter by the negative-going edge of the Q-output of the flip-flop 13. The time constant of the monostable multivibrator 21 is selected such that it generates a pulse signal P3 having a pulse width a little narrower than one-half horizontal interval, as shown in FIG. 3(e). The pulse signal P3 is further supplied to a monostable multivibrator 22 which is triggered by the negative-going edge of the former signal P3. As a result, the monostable multivibrator 22 produces a pulse signal P4 shown in FIG. 3(f) which has a pulse width of a few percent (e.g., 2.4%) of one horizontal interval. The pulse signal P4 is supplied to the D-terminal of a flip-flop 23, while the composite synchronizing signal S is supplied to clock-terminal thereof and the flip-flop 23 memorizes memories the condition of the pulse signal P4 at the time of the positive-going edge of the synchronizing signal S.

Since the pulse signal P4 is in its high level at the time of the second equalizing pulse, the Q-output of the flip-flop 23 becomes low upon the occurrence of the second equalizing pulse, as shown in FIG. 3(g). The equalizing pulses occur at every half horizontal interval. Thus, it is possible to detect the vertical synchronizing signal portion at the output of the flip-flop 23, as well as to detect the pulse width of the composite synchronizing signal S. The Q-output of the flip-flop 23 is supplied to the wave forming circuit 30 to produce the corresponding vertical synchronizing signal therefrom. Specifically, the Q-output of the flip-flop 23 is supplied to a monostable multivibrator 31 to trigger the latter by the negative-going edge of the signal shown in FIG. 3(g). The monostable multivibrator 31 produces a pulse signal P5 having a sufficient pulse width to cover the vertical synchronizing signal and the second equalizing pulse portion, as shown in FIG. 3(h). This signal P5 prevents the corresponding vertical synchronizing signal from being generated a second time, for example, in the second equalizing pulse portion. The pulse signal P5 is further applied to a monostable multivibrator 32 to produce the corresponding vertical synchronizing signal P6, as shown in FIG. 3(i). It should be noted that the pulse width of the signal P6 is selected so that the trailing edge of the signal P6 is located at the middle of the vertical synchronizing signal portion.

FIG. 3(j) shows a composite synchronizing signal of an odd field. It is apparent that, the circuit of FIG. 2 will operate in the same manner for such a signal for the composite synchronizing signal S of an even field, so that a detailed explanation of such operation is omitted.

It is noted that the reason that the duration of the monostable multivibrator 22 is selected a few percent of the duration of the monostable multivibrator 21 is to enable the production of the corresponding vertical synchronizing signal, even if a reproducing speed of video tape in VTR is changed within some predetermined range. In the above-described embodiment, the durations of the monostable multivibrators 21 and 22 are preferably selected to be 31μsec and 1.5μsec, respectively. In other words, the duration of the monostable multivibrator 22 is selected to be about 2.4% of that of the monostable multivibrator 23. Further, if it is desired to change the reproducing speed over a wide range, for instance, encompassing slow-motion and fast-motion reproducing, it is possible to obtain the corresponding vertical synchronizing signal by changing the duration of the monostable multivibrator 21 in response to the reproducing speed.

What is claimed is:

1. A circuit for forming a vertical synchronizing signal from a composite synchronizing pulse signal separated from a composite video signal, the composite synchronizing pulse signal being formed of an equalizing pulse portion positioned at the end of a field of the composite video signal and having a plurality of equalizing pulses each of a width approximately one-half the width of horizontal synchronizing signals occurring in the composite video signal and successive ones of said equalizing pulses being separated by an interval approximately one-half the interval between successive ones of said horizontal synchronizing signals, the circuit comprising:

means for discriminating between said equalizing pulses and said horizontal synchronizing signals on the basis of the respective widths thereof and providing an output indicating the presence of at least one such equalizing pulse; and means for generating a single corresponding vertical synchronizing signal at the end of a field in response to the output of said means for discriminating.

2. A circuit according to claim 1, in which said equalizing pulses and said horizontal synchronizing signals have leading and trailing edges defining the widths thereof, and in which said means for discriminating includes means for producing, in response to said leading edges, a discriminating pulse of a predetermined width less than the width of said horizontal synchronizing signals, said discriminating pulse having a trailing portion timed relative to said leading and trailing edges so that said trailing portion occurs earlier than the trailing edges of said horizontal synchronizing signals, but later than the trailing edges of said equalizing pulses; and means for comparing the timing of said discriminating pulse with that of the pulses contained in said composite synchronizing pulse signal and generating an output signal whenever one of said equalizing pulses is discriminated on the basis of such comparison.

3. A circuit according to claim 2, in which said means for producing a disciminating pulse includes a first monostable multivibrator triggered by the leading edges of the horizontal synchronizing signals and equalizing pulses contained in said composite synchronizing pulse signal to generate a first pulse signal of a first predetermined duration, and a second monostable multivibrator triggered by said first pulse signal to generate as said discriminating pulse a second pulse signal of a second predetermined duration at a position delayed by a time determined by said first predetermined duration.

4. A circuit according to claim 2, in which said means for comparing includes a D-type flip-flop having a D-input terminal and a clock input terminal, said discriminating pulses are supplied to said D-input terminal and said composite synchronizing pulse signal is supplied to said clock input terminal.

5. A circuit according to claim 1, in which said means for generating a corresponding synchronizing signal includes a monostable multivibrator for generating, in response to a discrimination of one of said equalizing pulses, a long pulse signal having a duration extending at least beyond any of said equalizing pulses remaining in the composite synchronizing pulse signal at the end of said field; and another monostable multivibrator triggered by said long pulse signal to generate said corresponding vertical synchronizing signal.

6. A circuit according to claim 1, further comprising means for detecting the interval between successive pulses in said composite synchronizing pulse signal and enabling said means for generating a corresponding vertical synchronizing signal only when the interval between said successive pulses is substantially the same as the interval between successive equalizing pulses.

7. A circuit according to claim 6, in which said means for detecting the interval between pulses includes a monostable multivibrator, triggered by the discrimination of said equalizing pulses, to generate a gate pulse having a pulse width less than one-half the width of a horizontal scanning interval; another monostable multivibrator triggered by said gate pulse to generate a detecting pulse at the end of the duration of said gate pulse; and a D-type flip-flop having a D-input terminal and a clock input terminal, said detecting pulse being supplied to said D-input terminal, and said composite synchronizing pulse signal being supplied to said clock input terminal.

* * * * *